(12) United States Patent
Cypher et al.

(10) Patent No.: US 7,987,446 B2
(45) Date of Patent: *Jul. 26, 2011

(54) METHOD FOR AUTOMATING VARIABLES IN END-USER PROGRAMMING SYSTEM

(75) Inventors: Allen George Cypher, Aptos, CA (US); Eben Merriam Haber, Cupertino, CA (US); Eser Kandogan, Mountain View, CA (US); Tessa Ann Lau, Mountain View, CA (US); James Lin, Cupertino, CA (US); Danny Greg Little, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1122 days.

This patent is subject to a terminal disclaimer.

(21) Appl. No.: 11/739,338

(22) Filed: Apr. 24, 2007

(65) Prior Publication Data

US 2008/0270445 A1    Oct. 30, 2008

(51) Int. Cl.
*G06F 9/44* (2006.01)

(52) U.S. Cl. ........ 717/106; 717/111; 717/114; 717/139; 715/210; 715/733

(58) Field of Classification Search .................. None
See application file for complete search history.

(56) References Cited

U.S. PATENT DOCUMENTS

| | | | | |
|---|---|---|---|---|
| 4,899,276 A * | 2/1990 | Stadler | | 715/705 |
| 5,187,788 A * | 2/1993 | Marmelstein | | 717/109 |
| 5,237,652 A * | 8/1993 | McManus | | 715/839 |
| 5,263,174 A * | 11/1993 | Layman | | 715/841 |
| 5,355,469 A * | 10/1994 | Sparks et al. | | 714/38 |
| 5,404,519 A * | 4/1995 | Denio | | 719/328 |
| 5,687,378 A * | 11/1997 | Mulchandani et al. | | 717/131 |
| 5,742,828 A * | 4/1998 | Canady et al. | | 717/144 |
| 5,821,932 A * | 10/1998 | Pittore | | 715/809 |
| 5,940,843 A * | 8/1999 | Zucknovich et al. | | 715/210 |
| 6,005,566 A * | 12/1999 | Jones et al. | | 715/788 |
| 6,113,651 A * | 9/2000 | Sakai et al. | | 717/154 |
| 6,154,720 A | 11/2000 | Onishi et al. | | |
| 6,257,774 B1 * | 7/2001 | Stack | | 717/110 |
| 6,571,285 B1 | 5/2003 | Groath et al. | | |
| 6,601,233 B1 | 7/2003 | Underwood | | |

(Continued)

OTHER PUBLICATIONS

Title: Genetic network programming with automatically generated variable size macro nodes, author:Nakagoe, H, source: IEEE, dated: Jun. 19, 2004.*

(Continued)

*Primary Examiner* — Chameli C Das
(74) *Attorney, Agent, or Firm* — Schmeiser, Olsen & Watts (57) ABSTRACT

A method for automating variables in an end-user programming system is disclosed. The end-user programming system comprises a script, a shared repository, at least one database, a recorder, an interpreter, and an execution engine. The script comprises at least one command describing an event comprising a data value. Each user has a uniquely identified entry set for the entries distributed in at least one database. The interpreter automatically creates a variable for a data value in a command by comparing the data value with each entry value in the entry set for the user recording the command. The interpreter automatically instantiates a variable in a command with an entry value by comparing the variable with each entry name in the entry set for the user executing the command.

1 Claim, 5 Drawing Sheets

U.S. PATENT DOCUMENTS

| | | | |
|---|---|---|---|
| 6,691,301 B2 * | 2/2004 | Bowen | 717/114 |
| 6,718,535 B1 | 4/2004 | Underwood | |
| 7,100,195 B1 | 8/2006 | Underwood | |
| 7,308,674 B2 | 12/2007 | Fairweather | |
| 7,451,432 B2 * | 11/2008 | Shukla et al. | 717/106 |
| 7,788,661 B2 | 8/2010 | Axnix et al. | |
| 2002/0178434 A1 * | 11/2002 | Fox et al. | 717/106 |
| 2003/0018506 A1 | 1/2003 | McLean et al. | |
| 2003/0208743 A1 * | 11/2003 | Chong et al. | 717/106 |
| 2006/0074732 A1 * | 4/2006 | Shukla et al. | 705/8 |
| 2006/0259949 A1 | 11/2006 | Schaefer et al. | |
| 2007/0112714 A1 | 5/2007 | Fairweather | |
| 2008/0022257 A1 | 1/2008 | Baartman et al. | |
| 2008/0208850 A1 | 8/2008 | Boyce | |
| 2009/0024667 A1 | 1/2009 | Noda | |
| 2010/0070448 A1 | 3/2010 | Omoigui | |

OTHER PUBLICATIONS

Title: A1: end-user programming for web-based system administration, author: Eser Kandogan et al, source: ACM.*

Cypher, Allen; Koala: Capture, share, Automate, Personalize business Processes on the Web; 2007. 4 pages.

Office Action (Mail Date: May 23, 2011) for U.S. Appl. No. 12/125,141, Filing Date May 22, 2008; Confirmation No. 4004.

* cited by examiner

METHOD FOR AUTOMATING VARIABLES IN END-USER PROGRAMMING SYSTEM

FIELD OF THE INVENTION

The present invention discloses a method for automating variables in an end-user programming system.

BACKGROUND OF THE INVENTION

Conventional end-user programming systems record user activities to create a program. Consequently, the program created in a conventional end-user programming system contains unique data applicable only for the user who created the program. User-specific data within a program prohibits the program from being shared among multiple users. Other types of conventional end-user programming systems require users to record all activities performed to find correct information for a user in a database, and to fill the found information into an input field within the program. Still other conventional applications and/or websites often require users to manually fill in information. In conventional end-user programming systems described above, recording and/or executing a program is laborious and time-consuming. To provide a more general application programming interface, a programming system typically requires programming language skill and knowledge about the programming interface, which makes the system difficult for end-users to use.

Thus, there is a need for a method that overcomes at least one of the preceding disadvantages of current end-user programming methods.

SUMMARY OF THE INVENTION

The present invention provides a method for automatically creating variables in an end-user programming system, wherein the end-user programming system comprises a script, a shared repository, at least one database, a recorder, and an interpreter, wherein a script comprises at least one command, wherein a current user has an entry set stored in said at least one database, each entry set being uniquely identified for each user, each entry set comprising an entry, the entry comprising an entry name and an entry value associated with the entry name, the method comprising:

receiving a command to generalize, wherein the command describes an event comprising a target and an action performed on the target, said target representing an object comprising at least one data value, said action comprising a user activity associated with the object and zero or more data values;

finding N entries in the entry set for the current user such that each entry value of said N entry is equal to a corresponding data value in the command, wherein N is a positive integer representing a number of data values in the command;

generalizing each data value into a variable in the command after said finding; and storing the command having N variables therein into the shared repository, wherein said receiving, said finding, said generalizing, and said storing are performed by the interpreter.

The present invention provides a method for automatically instantiating variables in an end-user programming system, wherein the end-user programming system comprises a script, a shared repository, at least one database, an interpreter, and an execution engine, wherein a script comprises at least one command, wherein a current user has an entry set stored in said at least one database, each entry set being uniquely identified for each user, each entry set comprising an entry, the entry comprising an entry name and an entry value associated with the entry name, wherein the execution engine performs the event described in said command, the method comprising:

retrieving a command to instantiate, wherein the command comprises at least one variable and describes an event comprising a target and an action performed on the target;

finding N entries in the entry set for the current user such that each entry name of said N entries is equal to a variable name of a corresponding variable in the command, wherein N is a positive integer representing a number of variables in the command;

instantiating each variable in the command with an entry value of corresponding entry after said finding;

sending, to the execution engine, the command having the instantiated variables therein, wherein said retrieving, said finding, said instantiating, and said sending are performed by the interpreter.

The present invention provides a computer program product, comprising a computer usable medium having a computer readable program code embodied therein, said computer readable program code containing instructions that when executed by a processor of a computer system implement a method for automatically creating variables in an end-user programming system, wherein the end-user programming system comprises a script, a shared repository, at least one database, a recorder, and an interpreter, wherein a script comprises at least one command, wherein a current user has an entry set stored in said at least one database, each entry set being uniquely identified for each user, each entry set comprising an entry, the entry comprising an entry name and an entry value associated with the entry name, the method comprising:

receiving a command to generalize, wherein the command describes an event comprising a target and an action performed on the target, said target representing an object comprising at least one data value, said action comprising a user activity associated with the object and zero or more data values;

finding N entries in the entry set for the current user such that each entry value of said N entry is equal to a corresponding data value in the command, wherein N is a positive integer representing a number of data values in the command;

generalizing each data value into a variable in the command after said finding; and storing the command having N variables therein into the shared repository, wherein said receiving, said finding, said generalizing, and said storing are performed by the interpreter.

The present invention provides a computer program product, comprising a computer usable medium having a computer readable program code embodied therein, said computer readable program code containing instructions that when executed by a processor of a computer system implement a method for automatically instantiating variables in an end-user programming system, wherein the end-user programming system comprises a script, a shared repository, at least one database, an interpreter, and an execution engine, wherein a script comprises at least one command, wherein a current user has an entry set stored in said at least one database, each entry set being uniquely identified for each user, each entry set comprising an entry, the entry comprising an entry name and an entry value associated with the entry name, wherein the execution engine performs the event described in said command, the method comprising:

retrieving a command to instantiate, wherein the command comprises at least one variable and describes an event comprising a target and an action performed on the target;

finding N entries in the entry set for the current user such that each entry name of said N entries is equal to a variable name of a corresponding variable in the command, wherein N is a positive integer representing a number of variables in the command;

instantiating each variable in the command with an entry value of corresponding entry after said finding;

sending, to the execution engine, the command having the instantiated variables therein, wherein said retrieving, said finding, said instantiating, and said sending are performed by the interpreter.

The present invention provides a method that overcomes at least one of the current disadvantages of conventional end-user programming methods.

DETAILED DESCRIPTION OF THE INVENTION

The method of the present invention is applied to an end-user programming system, which permits an end user to generate data contents and to create programs. In an end-user programming system, an end user who is not a programmer creates a program by recording user activities or by specifying data values for fill-in forms. Examples of an end-user programming system may be, inter alia, programming by demonstration, visual programming, forms-based programming, natural-language programming, etc.

While creating a program, the user often enters in data specific to the user who is creating the program (e.g., a name, phone number, or job title). Or, the data may be appropriate only in the user's context (e.g., job function or organization), which is a data environment of the end-user programming system at the time of creating the program. Contrary to conventional end-user programming methods, such as macros, which record specific data values as provided at the time of creating the program, the method of present invention generalizes a data value specific to a user by automatically creating a variable for the data value. A database entry associated with the user recording the program is employed in creating a variable from a data value. The program that is recorded references not the specific data values, but the abstracted variables in the database. Therefore, the present invention enables users of an end-user programming system to easily share a program.

When a user executes a program containing automatically created variables, the method of present invention automatically instantiates variables with data specific to the user executing the program. A database entry associated with the user executing the program is employed in providing a user-specific data value to a variable. Therefore, the user can easily execute a program created by other users without manually changing the program to translate the data values in the program.

The present invention makes creating and executing of a program simple and efficient for users. Moreover, users of the present invention do not have to either master programming language skills or have expertise on application programming interfaces (APIs) and/or the environment of the end-user programming system. Therefore, the method of present invention overcomes disadvantages of conventional end-user programming.

The term variable relates to a piece of data stored in a memory device. A variable comprises a name and a value, wherein the name represents the portion of the memory device where the data is stored, and the value represents actual data stored in the portion of the memory device. Consequently, a variable may have different values over time for the same name. In a computer program, a variable is often used to represent data values that vary from one execution to another. In the present invention, because a program created by one user with user-specific data values is stored as a program with variables instead of the provided data values, other users can easily execute the program with data values specific to the user who is executing the program. The term automation means automatic creation and/or automatic instantiation.

Figure 1:
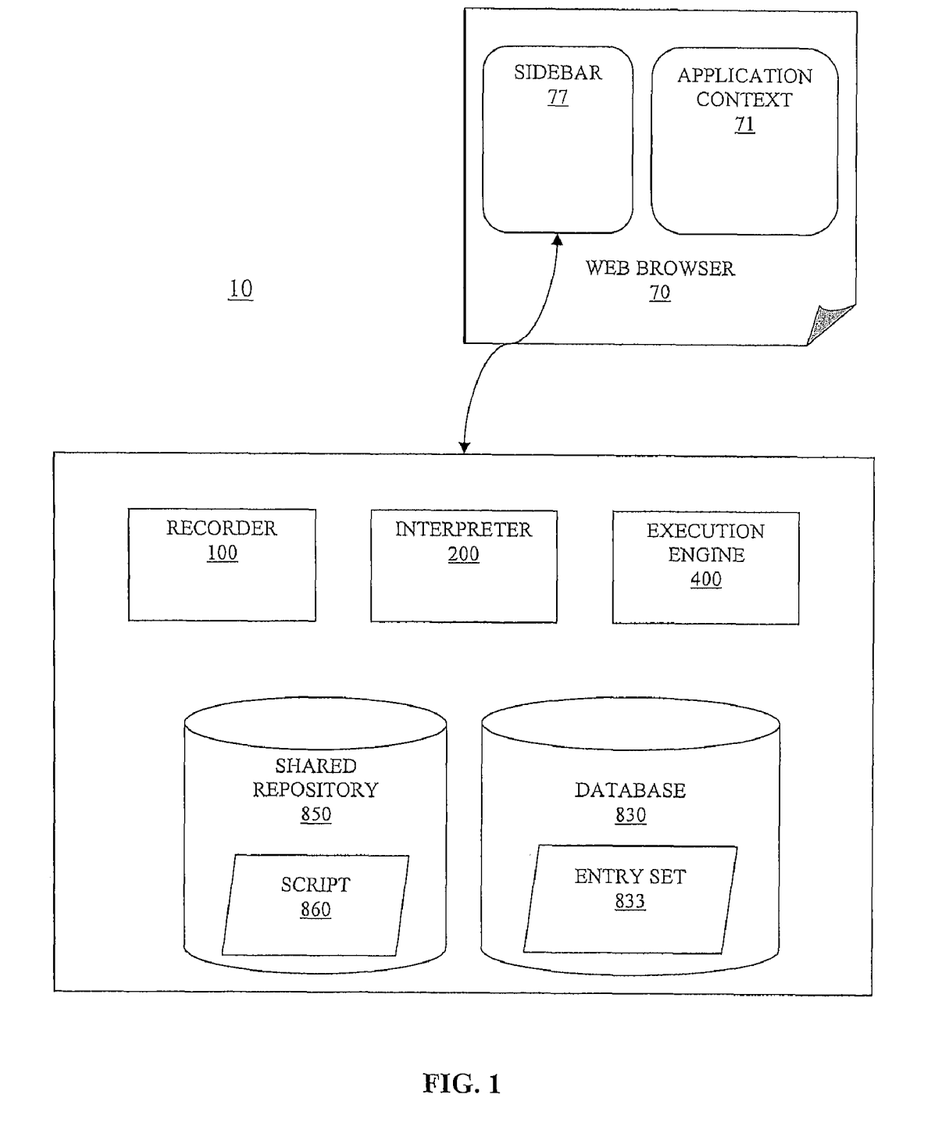
FIG. 1 is a diagram depicting a system to perform the method for automating variables in end-user programming system, in accordance with the embodiments of the present invention.

FIG. 1 is a diagram depicting a system 10 to perform the method for automating variables in end-user programming environment, in accordance with the embodiments of the present invention. The system 10 comprises a recorder 100, an interpreter 200, an execution engine 400, at least one database 830 that comprises an entry set 833, and a shared repository 850 that comprises at least one script 860. A user interacts with the system through a workspace called a sidebar 77 displayed within a web browser 70.

The script 860 comprises at least one command. A command may be generated by recording events performed by a user or by writing down an event in pseudo-natural language. See description in FIG. 2, infra, for the details on a command. Events are performed within an application context 71, which provides a data environment for a script to be recorded or to be performed. Examples of an application context may include, inter alia, a web context document written in Hypertext Markup Language (HTML).

The shared repository 850 stores scripts along with additional information on the script. Examples of additional information on a script may be, inter alia, author of the script, the time record of most recent edition on the script, the number of times that the script has been used, popularity rate information of the script, etc. A user can create and store a script into the shared repository. A user can view, edit, and/or run a script stored in the shared repository. A user may search and/or browse the shared repository to find a script of interest.

The database 830 comprises at least one set of entries called an entry set 833 that is organized per user. There is at least one database in the system, and a user may have multiple entries distributed in multiple databases. The entry set for each user of the present invention is uniquely identifiable. The entry set comprises at least one entry stored in any one of databases. Each entry in an entry set comprises a name of the entry called entry name and a value of the entry called entry value. An entry is accessible by the entry name and/or by the entry value. Examples of a database may be, inter alia, a personal database built by a user, a corporate database and/or a community database built by an organization, a context-dependent database with dynamic contents, etc. The term context-dependent database means a database linked to various types of data comprising a runtime data environment. Examples of data comprising a runtime data environment may be, inter alia, a specific context document, location information of a user, network and/or connection information used for a session, a type of communicating device employed by a user, etc. When a user access a system of the present invention employing a context-dependent database, an entry set for the user is dynamically established with entries stored in the context-dependent database according to a runtime data environment.

A user of the present invention may create a new entry in a personal database by typing an entry name and an entry value into the sidebar. See description in FIG. 2, infra, for the details on the sidebar. All database entries for current user are made available in utilizing the present invention. Within an entry set for a specific user, if more than one database is employed, entries of each database may be distinguished by using a database name as a part of an entry name.

The recorder 100 records an event performed by a user into a command. See description in FIG. 2, infra, for the details of a command. Examples of an event performed by a user may be, inter alia, typing of a text string, clicking of a button, etc.

The interpreter 200 automatically creates variables while creating a new script and automatically instantiates variables while executing a script. The interpreter receives a command comprising a data value from the recorder, identifies an entry value that is equal to each data value present in the command, and rewrites the command to reference the variable name rather than the literal data value. The interpreter may receive a text input written in pseudo-natural language by a user who creates a new script, parse the text input into a command, and then proceed with same steps as the interpreter that has received a command from the recorder. Conversely, the interpreter instantiates each variable in a command with an entry value associated with an entry name that is same as the variable. Details of the interpreter operations are described in FIGS. 3 and 4, infra.

The execution engine 400 executes a command. In executing a command, the execution engine simulates an event performed by a user using the information described in the command. See description in FIG. 2, infra, for the details of a command.

Figure 2:
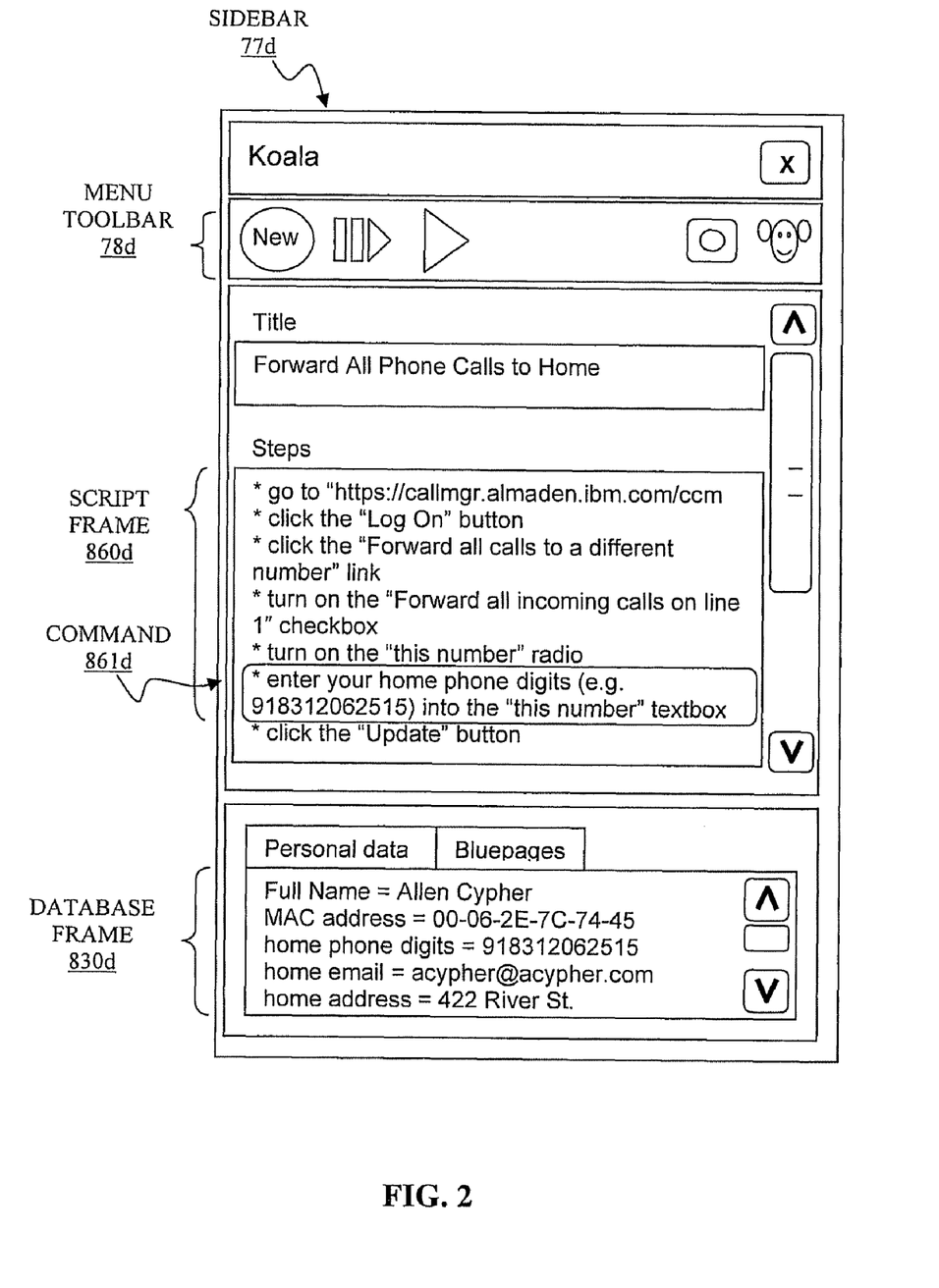
FIG. 2 is a snapshot of an application programming interface (API) workspace called a sidebar employed in the method for automating variables in end-user programming system, in accordance with the embodiments of the present invention.

FIG. 2 is a snapshot of a workspace called a sidebar 77*d* employed in the method for automating variables in an end-user programming system, in accordance with the embodiments of the present invention. The sidebar 77*d* is displayed within a web browser. The sidebar 77*d* displays a menu toolbar 78*d*, a current script within a script frame 860*d* and database entries within a database frame 830*d*. A user controls the operation of a recorder, an interpreter, and an execution engine with the menu toolbar 78*d*. Options provided in the menu toolbar comprise creating a new script, executing a next command from a current script, executing all commands until the end of the current script, stopping execution of the current script, and displaying a shared repository in a web browser main window. A user may select a script from the shared repository for executing, editing, rating, and/or commenting.

Within the script frame 860*d*, a current script comprising at least one command is displayed. A command is a textual description of a web event. The web event may be performed by a user or by the execution engine. The textual description is not presented in a specific programming language, but in a pseudo-natural language. Consequently, the command in the present invention is easy for an end user to understand.

A command comprises a target and an action. A target is an object on which user performs action to interact with the context. Examples of a target may be, inter alia, hypertext link, button, checkbox, text box, dropdown menu, etc. The target may have at least one data value within the target as an element. An action is a description of user activity which is performed on a target in a same command. Examples of an action associated with a target may be, inter alia, go-to action for a hyperlink target, click action for a button target, etc.

In the script frame 860*d*, each step beginning with an asterisk is a command. A command 861*d* is an example of a command with an automatically created variable. For further details on the command 861*d*, see descriptions in FIGS. 3 and 4, infra.

Figure 3:
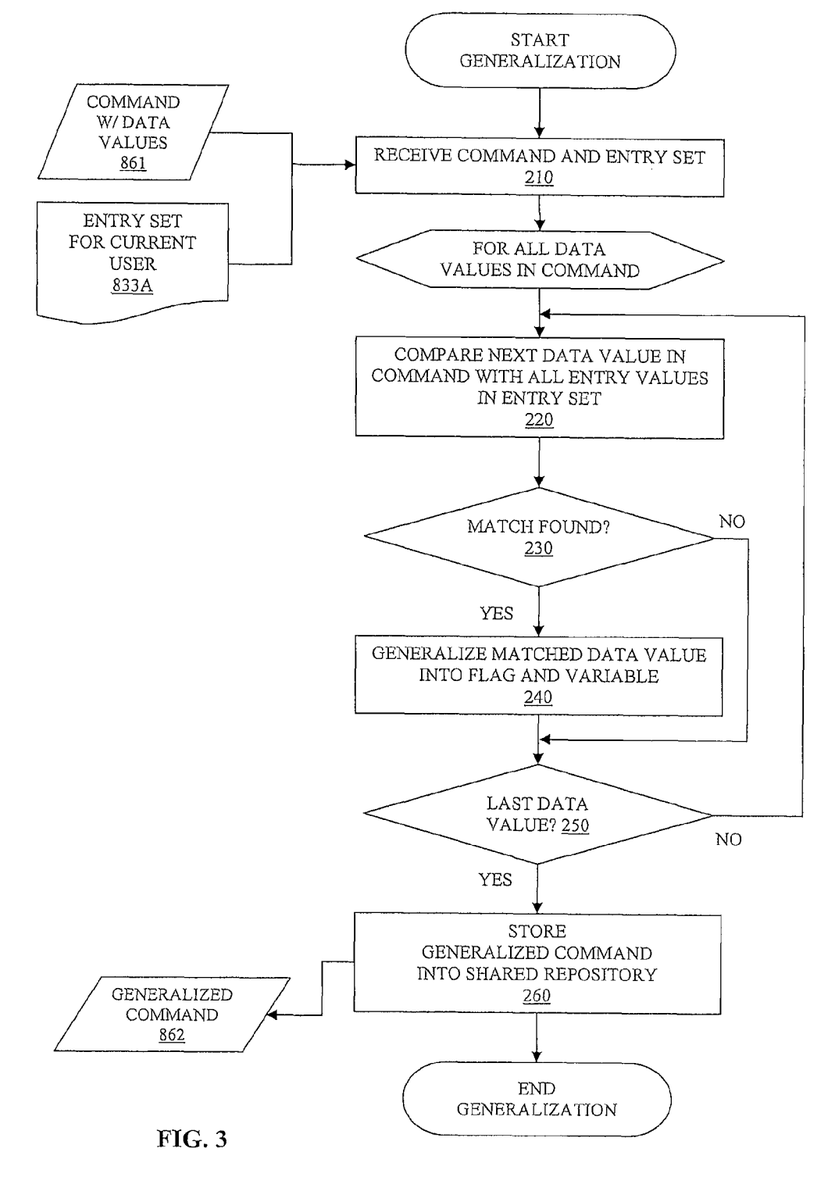
FIG. 3 is a flow chart depicting a method for automatically creating variables in an end-user programming system, in accordance with embodiments of the present invention.

FIG. 3 is a flowchart depicting a method for automatically creating variables in an end-user programming system, in accordance with the embodiments of the present invention. The term generalization means the automatic creation of variables within a command for user-specific data values because a user-specific data value is generalized into a variable named after an entry name associated with an entry value which is same as the user-specific data value, thus the command becomes applicable to other users through the variable created by the present invention.

In step 210, the interpreter receives a command and an entry set for a current user. The command is a description of an event comprising a target and an action performed on the target. The command may be generated by the recorder or by the interpreter. The recorder generates a command by recording an event into a target and an action as a user performs the event. Where an event is described in a pseudo-natural language text by a user, a parser generates a command for the event by parsing the text into a target and an action. The parser may be implemented as a part of the interpreter.

In step 220, the interpreter compares a data value in the command with all entry values in the entry set for the current user to find a same entry value in the entry set with the data value in the command.

In step 230, the interpreter determines whether there is an entry in the entry set having an entry value that is equal to the data value being compared. If the interpreter determines that there is the entry having an entry value that is equal to the data value being compared, then in step 240 the interpreter identifies the entry, generalizes the matched data value by creating a variable having a variable name that is equal to an entry name of the identified entry, and replaces the data value being compared in the command with a flag string followed by the name of the variable. In one embodiment, the flag string is "your," to indicate a user that the variable demands data specific to the user. If the interpreter determines that there is no entry in the entry set having an entry value that is equal to the data value being compared in the command, then the interpreter proceeds to step 250.

In step 250, the interpreter determines whether all data values in the command have been generalized. If the interpreter determines that there is no more data values to generalize in the command, the interpreter in step 260 stores the generalized command in the shared repository and terminates generalizing the command. If the interpreter determines that there is a data value in the command left for generalization, the interpreter loops back to step 220 and repeats the method described in FIG. 3 with a next data value in the command.

The command 861*d* in FIG. 2 supra is a generalized command with an automatically created variable. While recording, a user types '918312062515' into a textbox named "this number," the interpreter creates a variable by looking up the entry set for the user, finding an entry value that is equal to '918312062515,' and replacing '918312062515' with a flag string "your" and a variable named "home phone digits," which is same as the entry name associated with the entry value '918312062515.'

Figure 4:
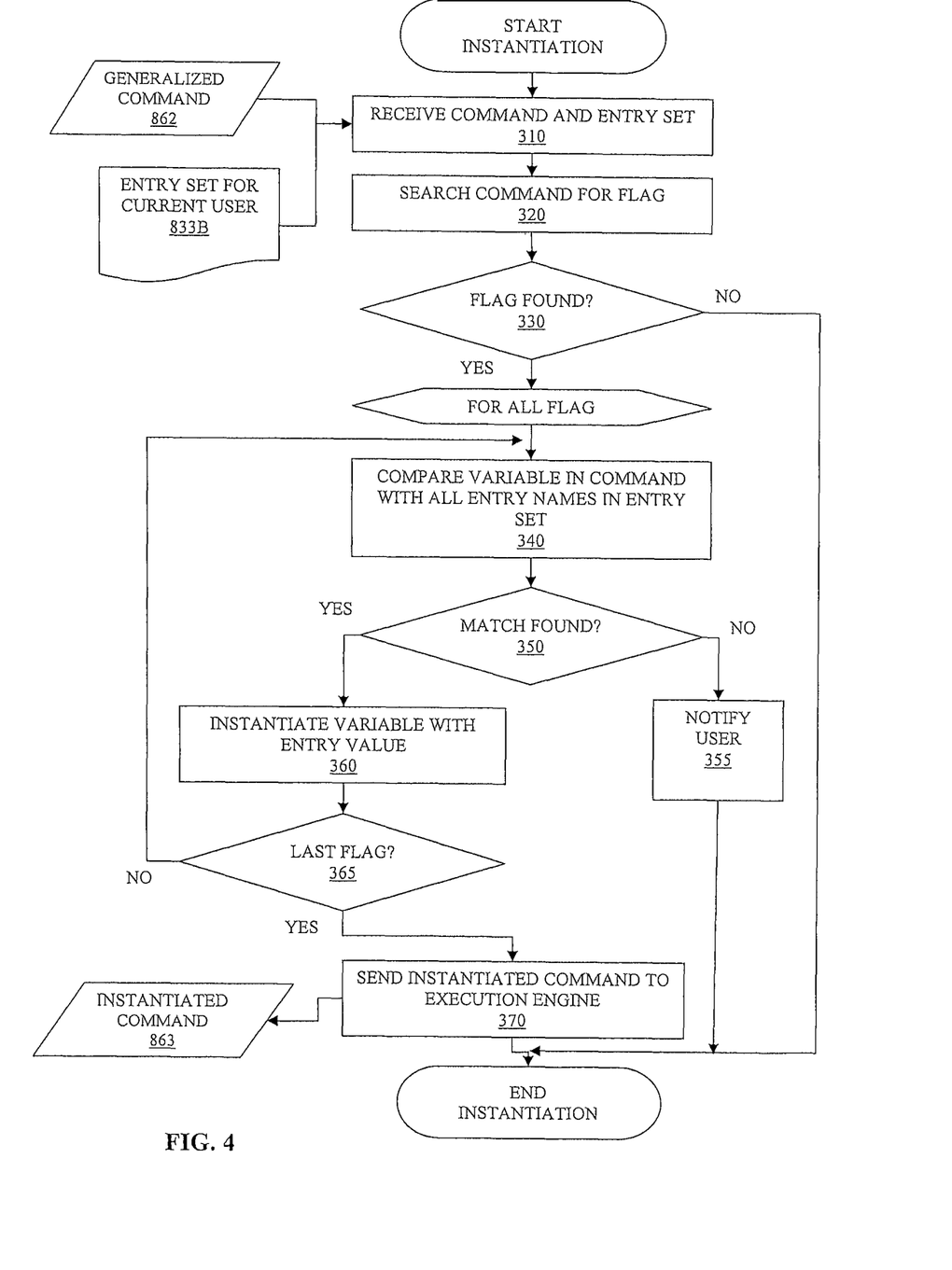
FIG. 4 is a flow chart depicting a method for automatically instantiating variables in an end-user programming system, in accordance with embodiments of the present invention.

FIG. 4 is a flowchart depicting a method for automatically instantiating variables in an end-user programming system, in accordance with the embodiments of the present invention.

In step 310, the interpreter receives a command to instantiate. The command may be received from a recorded script in the shared repository or may be generated by a parser. The command is recorded into the shared repository by the method described in FIG. 3 supra. A command may be generated from a pseudo-natural language description of an event given by a user. The parser parses the pseudo-natural language description into a command comprising a target and an action. The parser may be a part of the interpreter.

In step 320, the interpreter scans the command to find the flag string. In step 330, the interpreter determines whether the flag string was found in step 320. If the interpreter determines that the flag string has been found, the interpreter in step 340 compares a variable name following the flag string with all the entry names in the entry set for current user 833B. If the interpreter determines that the flag string has not been found in step 320, the interpreter terminates instantiating the command.

In step 350, the interpreter determines whether a variable was found in step 340. If the interpreter determines that the command comprises a variable having a variable name that is equal to an entry name in the entry set for the current user, then the interpreter in step 360 instantiates the flag string and the variable with an entry value of the entry associated with the entry name that is equal to the variable.

In step 355, in case when the interpreter in step 350 determines that there is no entry name that is equal to a variable following the flag string, the interpreter notifies the user that there is no matching entry in the entry set for the current user by highlighting the command in the script window. The notified user may, inter alia, manually perform the command, or update the entry set by creating a new entry which has an entry name same as the unfound variable name and a corresponding entry value.

In step 365, the interpreter determines whether all flag strings are compared and instantiated. If the interpreter determines that there is no more flag string in the command, the interpreter proceeds to step 370 because all variables in the command were instantiated with entry values for the current user. In step 370, the interpreter sends the instantiated command with entry values to the execution engine for performing an event described in the command. If the interpreter determines that there is a flag string left in the command, indicating that there is a flag string in the command to instantiate, the interpreter loops back to step 340 and repeats the method described in FIG. 4 with a next flag string.

For example, a user executes the command 861d in FIG. 2 supra, which is a command with an automatically created variable. The executing user may be different from the user who previously recorded the script and stored the script into the shared repository. The interpreter looks up an entry set for the executing user to find an entry name that is equal to a variable name in the command. If the executing user has an entry comprising an entry name that is equal to 'home phone digits' and the entry value is '918312068979,' then the interpreter instantiates the command as "enter '918312068979' into the "this number" textbox," and the execution engine would simulate a web event described in the command.

Figure 5:
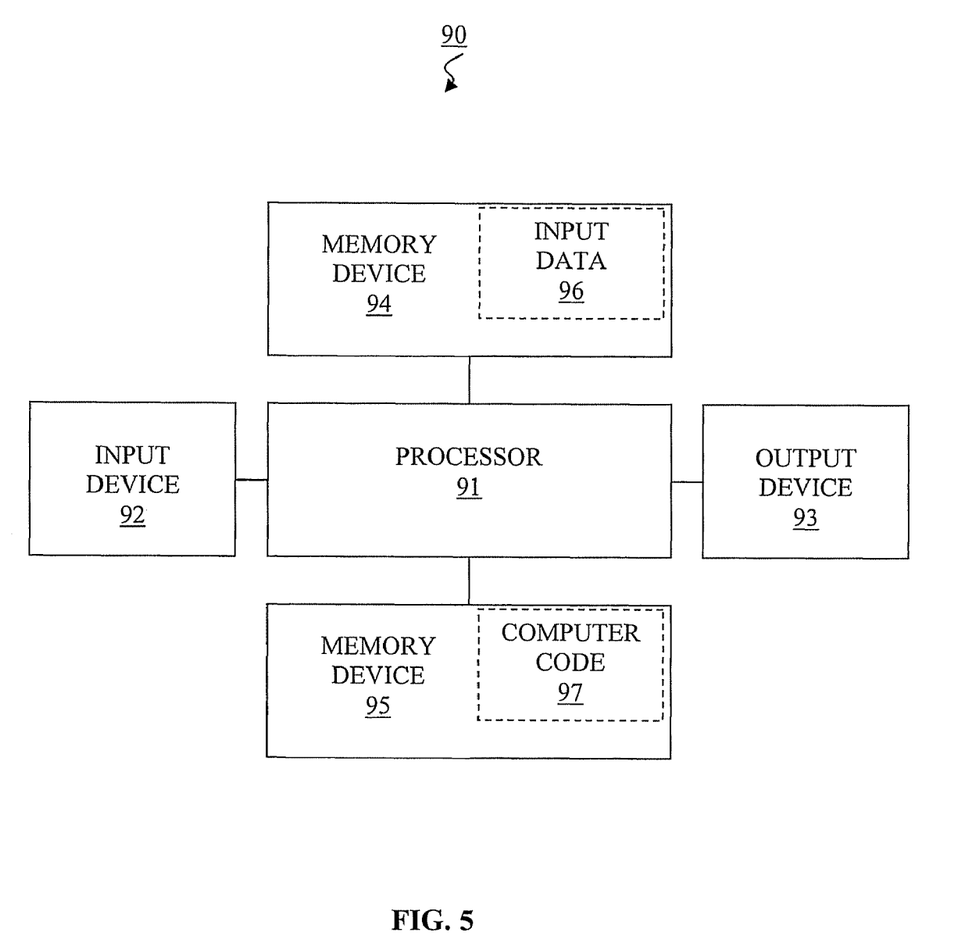
FIG. 5 illustrates a computer system used for automating variables in an end-user programming system, in accordance with embodiments of the present invention.

FIG. 5 illustrates a computer system 90 used for automating variables in end-user programming system, in accordance with embodiments of the present invention.

The computer system 90 comprises a processor 91, an input device 92 coupled to the processor 91, an output device 93 coupled to the processor 91, and memory devices 94 and 95 each coupled to the processor 91. The input device 92 may be, inter alia, a keyboard, a mouse, a keypad, a touchscreen, a voice recognition device, a network interface card (NIC), a Voice/video over Internet Protocol (VOIP) adapter, a wireless adapter, a telephone adapter, a dedicated circuit adapter, etc. The output device 93 may be, inter alia, a printer, a plotter, a computer screen, a magnetic tape, a removable hard disk, a floppy disk, a programmable compact disc (CD), a digital video disc (DVD), a NIC, a VOIP adapter, a wireless adapter, a telephone adapter, a dedicated circuit adapter, etc. The memory devices 94 and 95 may be, inter alia, a cache, a dynamic random access memory (DRAM), a read-only memory (ROM), a hard disk, a floppy disk, a magnetic tape, an optical storage such as a CD or a DVD, etc. The memory device 95 includes a computer code 97 which is a computer program that comprises computer-executable instructions. The computer code 97 includes, inter alia, an algorithm used for automating variables in end-user programming environment_according to the present invention. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 5) may be used as a computer usable medium (or a computer readable medium or a program storage device) having a computer readable program embodied therein and/or having other data stored therein, wherein the computer readable program comprises the computer code 97. Generally, a computer program product (or, alternatively, an article of manufacture) of the computer system 90 may comprise said computer usable medium (or said program storage device).

Thus the present invention discloses a process for deploying or integrating computing infrastructure, comprising integrating computer-readable code into the computer system 90, wherein the code in combination with the computer system 90 is capable of performing a method for automating variables in end-user programming environment_according to the present invention.

While FIG. 5 shows the computer system 90 as a particular configuration of hardware and software, any configuration of hardware and software, as would be known to a person of ordinary skill in the art, may be utilized for the purposes stated supra in conjunction with the particular computer system 90 of FIG. 5. For example, the memory devices 94 and 95 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

What is claimed is:

1. A method for automating variables in an end-user programming system, the method comprising:

creating at least one variable by a processor of a computer system on which the end-user programming system runs, wherein each variable of said at least one variable is created such that each variable generalizes a respective data value in an event upon recording of the event by a first user within a web context document of the first user, wherein the respective data value in the event matches an entry value of a respective entry for the first user, wherein the respective entry for the first user further comprises an entry name that corresponds to the entry value, wherein each created variable is assigned to a respective variable name identical to the entry name of the respective entry for the first user, wherein each variable is stored in a repository by the respective variable name of each variable, wherein the repository is shared by the first user and a second user of the end-user programming system; and subsequent to said creating, instantiating a variable of said at least one variable such that the variable is instantiated with an entry value of a corresponding entry for the second user when a variable name of the variable matches the entry name of the corresponding entry for the second user, wherein the second user is executing a command comprising the event within a web context document of the second user, wherein the end-user programming system comprises the repository, a database storing at least one entry for all users of the end-user programming system, and an interpreter, wherein the repository, the database, and the interpreter are configured to be controlled by a current user via an application programming interface (API) workspace that interfaces user activity with the end-user programming system within a web browser, wherein said at least one entry is configured to be dynamically modified via the application programming interface (API) workspace according to the information of the web context document of the first user while recording the event, wherein the respective data value is provided by the first user either in a pseudo-natural language description or as an input in a Hypertext Markup Language (HTML) element of the web context document of the first user.

* * * * *